United States Patent [19]

Cook

[11] 4,145,682
[45] Mar. 20, 1979

[54] SEMI-DUMP TRUCK LEVEL INDICATOR

[75] Inventor: John Cook, Dundas, Canada

[73] Assignee: Pullman Incorporated, Chicago, Ill.

[21] Appl. No.: 655,299

[22] Filed: Feb. 4, 1976

[51] Int. Cl.$^2$ ........................ B60Q 5/00; G08B 21/00
[52] U.S. Cl. .................................. 340/52 H; 180/104; 200/61.47; 340/689
[58] Field of Search ................... 340/52 R, 52 H, 261, 340/282; 200/61.45 R, 61.47, 61.52, 61.83; 180/104, 82 R; 33/335, 336, 337, 351

[56] References Cited

U.S. PATENT DOCUMENTS

| | | | |
|---|---|---|---|
| 2,782,276 | 3/1954 | Woods | 200/61.47 |
| 3,013,624 | 12/1961 | De Remer et al. | 180/82 |
| 3,464,755 | 9/1969 | Brown | 180/104 |
| 3,728,675 | 4/1973 | Horn et al. | 340/65 |
| 3,879,703 | 4/1975 | Bonazoli et al. | 340/25 |
| 3,921,128 | 11/1975 | Snead | 340/52 H |

FOREIGN PATENT DOCUMENTS

| | | | |
|---|---|---|---|
| 2432713 | 1/1976 | Fed. Rep. of Germany | 340/52 H |
| 48201 | 8/1919 | Sweden | 200/61.47 |

*Primary Examiner*—John W. Caldwell, Sr.
*Assistant Examiner*—Joseph E. Nowicki
*Attorney, Agent, or Firm*—Thomas G. Anderson

[57] ABSTRACT

A semi-dump level indicator comprising an electrical system including a pair of mercury switches mounted on the rear portion of the trailer. The switches are closed when the trailer is level. When the trailer is dangerously tilted gravity causes one of the switches to open which de-energizes a relay closing a warning light and alarm buzzer circuit in parallel with the circuit having the mercury switches to warn the operator not to raise the trailer.

9 Claims, 4 Drawing Figures

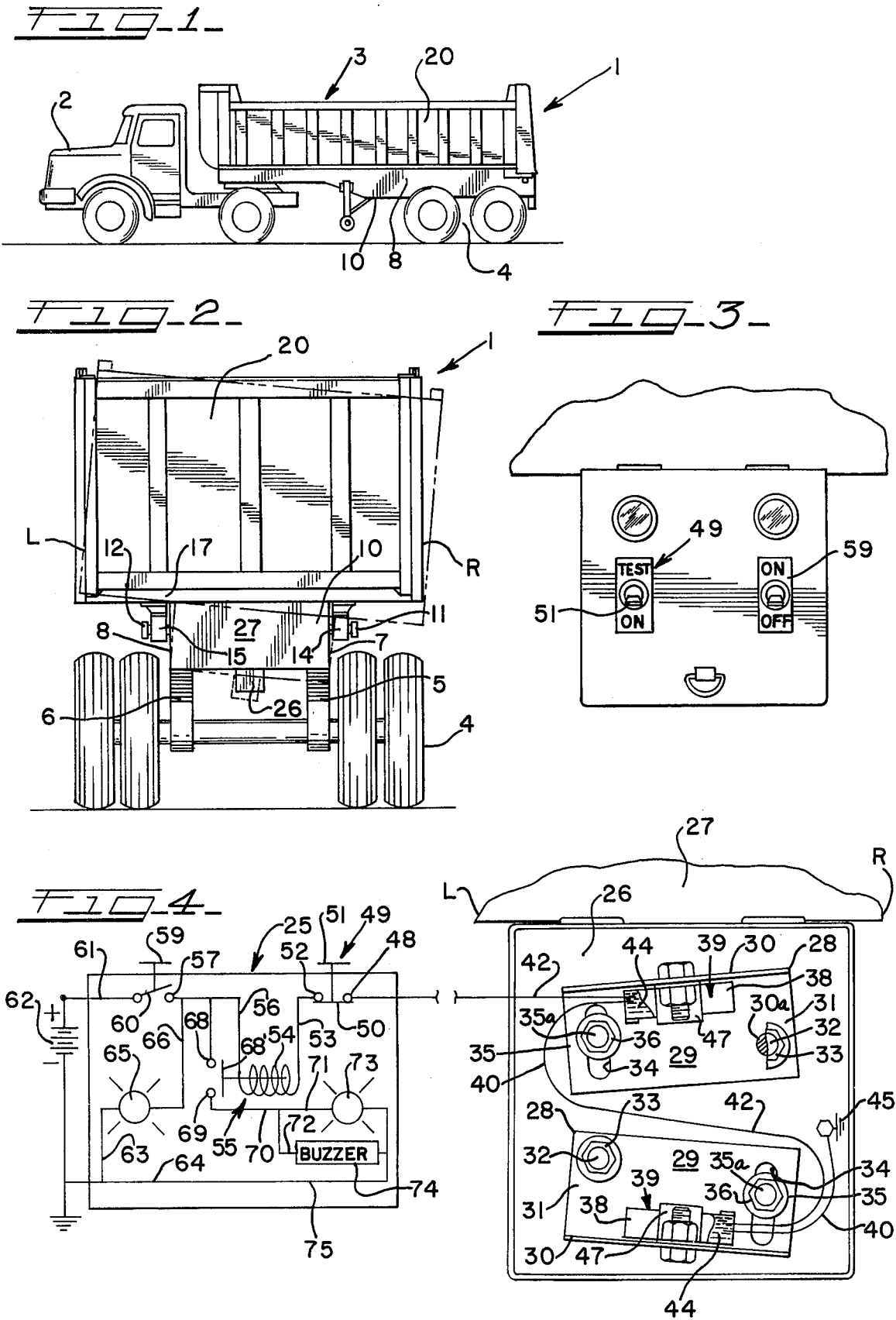

SEMI-DUMP TRUCK LEVEL INDICATOR

DESCRIPTION OF THE PRIOR ART

Prior art devices such as shown in U.S. Pat. No. 3,464,755 are known to indicate lateral tilt of a trailer dump body. The circuit however, is not fail safe inasmuch as a break in the circuit anywhere will not indicate such condition. Thus the operator is lulled into a sense of security in relying upon the equipment.

SUMMARY OF THE INVENTION

This invention is directed to a novel device for indicating body tilt which would be dangerous to the operator when the dump body is elevated to the dump position. The tilt may be occasioned by low tire pressure on one side of the trailer, by one of the rear wheels being on a soft spot or in a hole, etc.

A general object of the invention is to provide a novel tilt indicator which is fail safe and which assures the operator that the body is in vertical position safe for dumping.

A more specific object is to provide a novel circuitry incorporating a pair of series connected gravity operated switches which at one end are grounded and at the other end are connected through a coil of a relay to one side of a power source, such as a battery, the other end of the battery being grounded. The relay switch is normally closed when the coil is de-energized and completes a circuit through a light and buzzer alarm which at one end is connected to ground and on the other end to the other side of the power source. Thus any failure in the tilt indicating circuit such as a break in the line or opening of either gravity switch causes the coil to be de-energized closing the bypass switch and actuating the alarm circuit.

The invention also contemplates providing a on-off light to visually alert the driver that the on-off switch is operative and that current is available in the circuits.

These and other objects and advantages of the invention will become more readily apparent from the specifications and drawings wherein.

FIG. 1 is a side elevational view of typical tractor-trailer dump truck vehicle incorporating the invention;

FIG. 2 is an enlarged rear end view of the vehicle shown in FIG. 1;

FIG. 3 is a front view of the central panel and switch box which is part of the novel circuit; and FIG. 4 is a partly schematic circuit illustrating the invention.

DESCRIPTION OF THE INVENTION

The invention is illustrated with a vehicle generally indicated by 1 which includes a tractor 2 and a trailer 3 which has a tandem wheel and axle assembly 4 comprising springs 5 and 6 which support the lateral side members or sills 7 and 8 of a trailer chassis or underframe 10.

The underframe supports a pair of coaxial horizontal hinge pins or pintles 11 and 12 which extend outwardly from the frame members 7 and 8 and pivotally mount a pair of hinge brackets 14 and 15 which secure to the underframe 17 of the dump body generally designated by 20.

The dump body is adapted to be elevated about the hinge pintles upwardly at its forward end by suitable mechanism (not shown) but well known to those skilled in the art as illustrated, for example, in U.S. Pat. No. 2,887,672 which also illustrates a form of tilt warning device.

A primary feature of the invention is the provision of a novel lateral tilt warning or sensor system or device generally designated 25 in FIG. 4 and which includes a box with a vertical support plate 26 mounted upon the transverse rear beam member 27 of the chassis underframe 10 and extending flatwise transversely of the vehicle. On the support plate 26 there are mounted two brackets 28 of identical construction. Each bracket 28 is L-shaped in cross-section and comprises a vertical flange 29 and a fore-and-off extending flange 30 along one edge of each flange 29. Flange 29 has a hole 30a at one end 31 through which extends a bolt 32 secured to the support plate, the bolt having a nut 33 threaded thereon for securing the bracket to the plate. The bolt 32 provides a pivot for the bracket 28 so that its inclination to the horizontal may be adjusted within limits of the vertically elongated slot 34 in the opposite end 35 of the flange 28, the slot receiving a bolt 35a which is also secured to plate 26 and fits loosely in the slot, which could be of arcuate form having a radius from the center of the associated bolt 32. However for cost reasons, the slot is straight and bolt 35a is of a diameter considerably smaller than the width of slot 34. The bolt 35a has a nut 36 threaded thereon which abuts the flange 29 and secures the respective bracket in at selected inclination to the support plate 25.

It will be noted that the two brackets 28 are reversely inclined and that each has a body portion 38 of a mercury switch 39 secured to its flange 30 and that both switches are vertically aligned and are centered on substantially the longitudinal vertical center plane of the vehicle.

The lower switch is inclined to the right side of the vehicle and the upper switch is inclined to the left side of the vehicle indicated R and L, respectively. Each switch has a pair of leads 40 and 42 which extend into the body and in the vertical position of the vehicle are bridged or connected by a pool of mercury designated 44.

Lead 40 of the lower switch is connected to ground 45 and lead 42 is connected to lead 40 of the upper switch. Incidentally each body is connected to the flange 30 of the respective bracket by a clamp and bolt and nut assembly 47 as best seen in FIG. 4.

The upper lead 42 of the upper switch is connected to a contact 48 of a combination test and energizing switch 49 which has a contact arm 50 adapted when moved by handle 5 to bridge across contact 48 and contact 52 which is connected to a lead 53 at one end of a coil 54 of a relay switch 55, the other lead 56 of the coil being connected to one contact 57 of a manually operated on and off switch 59 which has an arm 60 connected to a lead 61 which is connected to one side of a power source such as the positive pole of a battery 62. The negative pole of the battery is connected to split leads 63 and 64. Lead 63 is connected across a lamp 65 to lead 66 connected to contact 57.

The relay switch 55 normally is spring-biased to closed position and has an arm 68′ which bridges contacts 68 and 69, contact 68 being connected to lead 56 and contact 69 being connected to split leads 71 and 72 which respectively connect to warning lamp 73 and to a buzzer 74, the lamp and buzzer being connected to lead 75 which is connected to the negative pole of the battery and thereby also being connected to ground.

Operation of the Device

In operation, the truck driver closes the on-off switch 59 which causes current to flow through the lamp 65 to the negative pole. Concurrently, with the test operating switch 49 in open or test position, the switch arm 68' closes the circuit across the leads 56 and 70 thus lighting lamp 73 and actuating the buzzer 74, the current flowing therethrough via lead 75.

Upon releasing test switch 49 to revert to its normal closed position, if the circuit is completed through the two mercury switches 39 to ground, the solenoid coil 54 is energized opening power switch 55. Thus, the warning lamp 73 is extinguished and the buzzer de-energized. If the body is tilted or the line 42 is broken, or the sensing switches malfunction, or the ground lead from the sensing switches is broken, the coil will not be energized thus failing to open power switch 55 and providing a fail safe system. In other words, the operator is warned either that the load is tilted or that the device is not operative.

A novel and effective safety device has been provided. It should be particularly noted that the locations of the switches are close to the center line of the vehicle so that they are not oversensitive to minor lateral inclinations but may be tuned to reflect inclinations which are considered dangerous.

A best mode of the invention has been disclosed. However, it will be apparent that various modifications and changes are contemplated and may be restored to without departing from the function or scope of the invention hereinafter defined in the appended claims.

What is claimed is:

1. In a dump vehicle, a safety device to signal excessive lateral tilt thereof with danger of tipping over the vehicle upon raising of the dump box thereon;

said device comprising first and second gravity actuated serially-coupled normally closed sensing switches adapted for mounting on the vehicle, said switches each having a first connection means coupled to each other, an electromotive power source having first and second connecting means, said first of said sensing switches having a second connection means coupled to a first connecting means of said electromotive power source, each sensing switch being responsive to a predetermined lateral inclination of the vehicle to open the switch, said second sensing switch having a second connection means, a warning system comprising a relay-operated normally closed power switch including a solenoid coil having one end coupled to said second connection means of said second sensing switch, means coupling said coil at a second end to a second connecting means on said power source for completing a circuit from the power source through said coil and through said sensing switches to said second connection means of the first sensing switch for energizing the coil to maintain said power switch in open position attendant to said sensing switches being closed and the connections between the coil and sensing switches and between the sensing switches and said first connecting means being complete, and alarm means adapted to be coupled through said power switch to said second connecting means and coupled to said first connecting means, whereby, upon the flow of current being interrupted through said coil said power switch is free to close the circuit through said alarm, and said switches being vertically spaced and mounted respectively above and below a predetermined substantially horizontal axis extending transversely of the vehicle intermediate horizontal planes of the hinge axis of the dump box and the axis of the rear wheel and axle assembly of the vehicle and in substantially vertical alignment with each other and generally centered on substantially the vertical longitudinal center plane of the vehicle.

2. The invention according to claim 1, and
a manually operable test switch between said one end of the coil and said second connection means of said second switch for connecting and disconnecting the same.

3. The invention according to claim 1, and
an on and off switch between said second connecting means on said power source and said second end of said coil.

4. The invention according to claim 3, and
a lamp circuit between said on and off switch and said first connecting means.

5. The invention according to claim 1, and
said alarm means comprising an alarm lamp circuit between said power switch and said first connecting means.

6. The invention according to claim 5, and
said alarm means comprising a buzzer in parallel with said alarm lamp circuit.

7. The invention according to claim 1, and
said sensing switches comprising oppositely inclined mercury switches.

8. The invention according to claim 1, and
test switch means for interrupting the circuit through said sensing switches.

9. The invention according to claim 1, and
means for adjustably mounting said sensing switches at selected inclinations transversely of the vehicle comprising a pivot mounting one end of each switch.

* * * * *